United States Patent [19]
Huang

[11] Patent Number: 5,845,539
[45] Date of Patent: Dec. 8, 1998

[54] BRAKING LEVER ASSEMBLY FOR SYNCHRONICALLY ACTUATING BRAKING MECHANISMS

[76] Inventor: Han-Chen Huang, No. 190, Hsin E St., Zen Te Village, Wu Jih Hsiang, Taichung Hsien, Taiwan

[21] Appl. No.: 908,927

[22] Filed: Aug. 8, 1997

[51] Int. Cl.⁶ .............................. G05G 9/00; F16C 1/10; F16D 65/30
[52] U.S. Cl. ..................... 74/489; 74/502.2; 188/24.16; 188/24.22
[58] Field of Search .................. 74/489, 502.2, 74/471 R; 188/24.16, 24.22

[56] References Cited

U.S. PATENT DOCUMENTS

| | | | |
|---|---|---|---|
| 4,267,746 | 5/1981 | Pruett ........................................ | 74/489 |
| 4,644,816 | 2/1987 | Cockburn .................................. | 74/489 |
| 4,850,241 | 7/1989 | Buckley et al. ........................ | 74/502.2 |
| 4,914,971 | 4/1990 | Hinkens et al. ........................ | 74/502.2 |
| 5,540,304 | 7/1996 | Hawkins et al. ....................... | 74/502.2 |

FOREIGN PATENT DOCUMENTS

| | | | |
|---|---|---|---|
| 516867 | 1/1993 | Japan .................................. | 188/24.16 |
| 132783 | 10/1920 | United Kingdom ..................... | 74/489 |

*Primary Examiner*—Rodney H. Bonck
*Assistant Examiner*—William C. Joyce
*Attorney, Agent, or Firm*—Beveridge, DeGrandi, Weilacher & Young, LLP

[57] ABSTRACT

The present invention relates to a braking lever assembly, more particularly, to a braking mechanism assembly for a motorcycle or bicycle in which the braking mechanisms of both the front and rear wheels can be simultaneously and synchronously actuated to ensure a safe and effective braking. As a result, driving safety can be properly ensured. The braking lever assembly generally comprises a mounting socket and a braking lever which is pivotally attached to the mounting socket. The mounting socket is provided with a pair of guiding holes for the braking cables. The braking lever is pivotally connected with a pulling rod by a 8-shape plate and the pulling rod in turn is provided with a pair of positioning holes for pivotally attaching the anchoring head of the braking cables therein. Wherein when the braking lever is depressed, the 8-shape plate together with the pulling rod are pulled backward such that the braking cables are pulled backward to actuate the braking mechanism for both the front and rear wheels. The wearing of the lining of each braking mechanism can be automatically adjusted and compensated by the shifting of the pulling rod which is pivotally attached to the 8-shape plate. Consequently, the front and rear braking mechanisms can be simultaneously actuated with equal braking force to ensure riding safety.

2 Claims, 3 Drawing Sheets

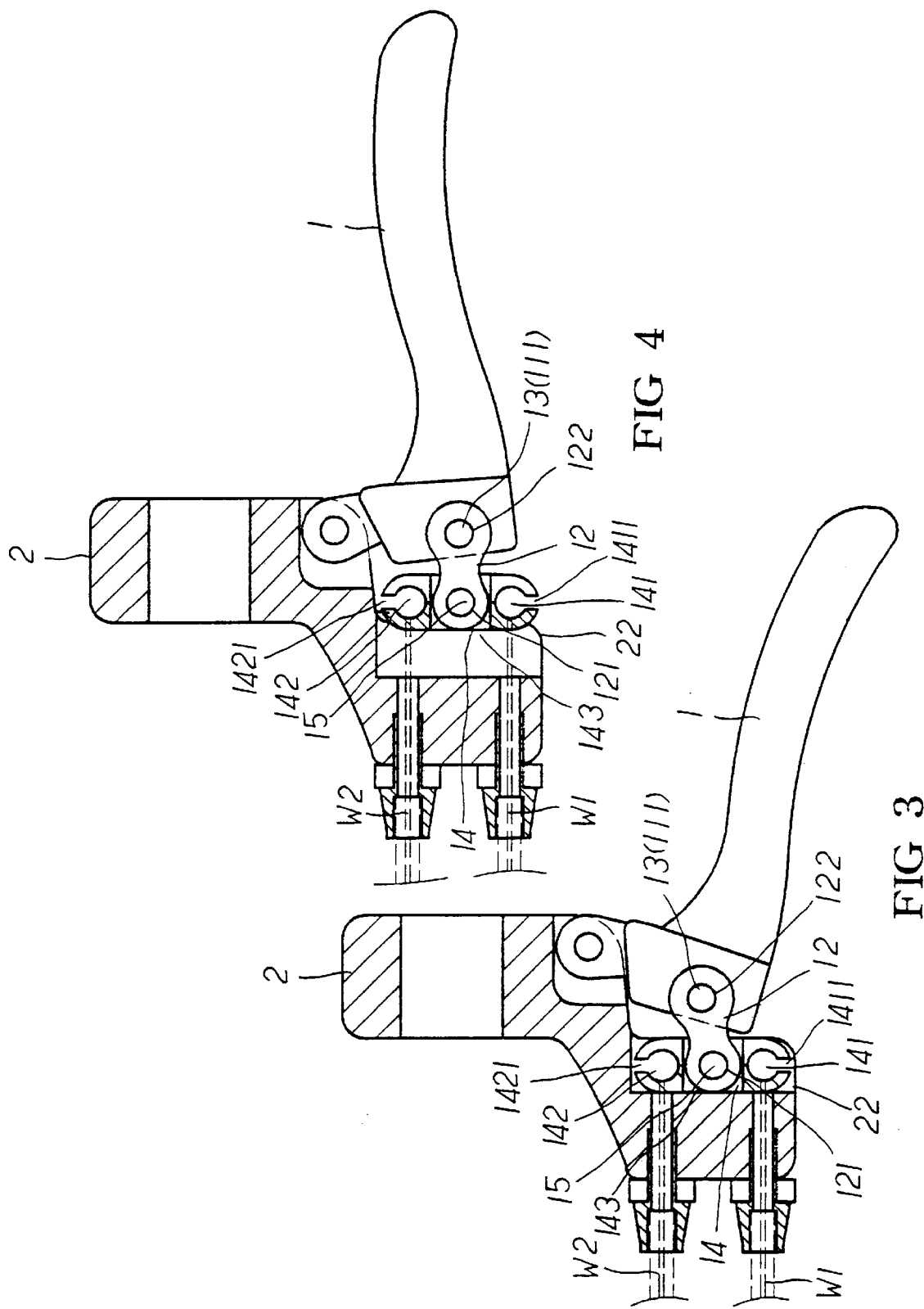

BRAKING LEVER ASSEMBLY FOR SYNCHRONICALLY ACTUATING BRAKING MECHANISMS

FIELD OF THE INVENTION

The present invention relates to a braking lever assembly, more particularly, to a braking mechanism assembly for motorcycle or bicycle in which the braking mechanisms of both the front and rear wheels can be simultaneously and synchronously actuated to ensure a safe and effective brakes. As a result, the driving safety can be properly ensured. The braking lever assembly generally comprises a mounting socket and a braking lever which is pivotally attached to the mounting socket. The mounting bracket is provided with a pair of guiding holes for the braking cables. The braking lever is pivotally connected with a pulling rod by means of a 8-shape plate and the pulling rod in turning is provided with a pair of positioning holes for pivotally attaching the anchoring head of the braking cables therein. Wherein when the braking lever is depressed, the 8-shape plate together with the pulling rod are pulled backward such that the braking cables are pushed backward to actuate the braking mechanism for both the front and rear wheels. The wearing of the lining of the braking mechanism can be automatically adjusted and compensated by the shifting of the pulling rod which is pivotally attached to the pulling rod of the braking lever. Consequently, the front and rear braking mechanisms can be simultaneously actuated with the equal braking force to ensure the riding safety.

DESCRIPTION OF PRIOR ART

In the existing bicycle and motorcycle, the braking mechanisms for both the front and rear wheels are respectively controlled by an individual braking lever which is pivotally mounted at both ends of the handlebar of the bicycle or motorcycle. Normally, it is hard to depress both braking levers simultaneously and synchronously. If the front wheel is stopped and the back wheel is still running, the tail of the bicycle or motorcycle will swing aside and in most serve situation, the bicycle or motorcycle may fall down resulted from this unbalanced situation. On the other hand, as the riding speed increases, the braking force required to stop the wheels are also increased proportionally. If the front and rear braking levers can be simultaneously depressed, the braking forces will be doubled and the bicycle and/or motorcycle can be stopped in a balanced manner. As a matter of fact, when both the front and rear wheels are stopped simultaneously, the bicycle and/or motorcycle can be kept in balance without rolling or swinging.

SUMMARY OF THE INVENTION

It is the objective of this invention to provide a braking mechanism assembly for motorcycle or bicycle in which the braking mechanisms of both the front and rear wheels can be simultaneously and synchronously actuated to ensure a safe and effective brakes.

In order to achieve the objective set forth, the braking lever assembly generally comprises a mounting socket and a braking lever which is pivotally attached to the mounting socket. The mounting socket is provided with a pair of guiding holes for the braking cables. The braking lever is pivotally connected with a pulling rod by means of a 8-shape plate and the pulling rod in turning is provided with a pair of positioning holes for pivotally attaching the anchoring head of the braking cables therein. Wherein when the braking lever is depressed, the 8-shape plate together with the pulling rod are pulled backward such that the braking cables are pulled backward to actuate the braking mechanism for both the front and rear wheels.

According to one aspect of the present invention, the wearing of the lining of the braking mechanism can be automatically adjusted and compensated by the shifting of the pulling rod which is pivotally attached to the pulling rod of the braking lever. Consequently, the front and rear braking mechanisms can be simultaneously actuated with the equal braking force to ensure the riding safety.

According to another aspect of the braking lever assembly of the present invention, the mounting bracket is provided with a hidden groove for receiving the pulling rod and the 8-shape plate of the braking lever. As a result, the overall bulk size is reduced and the swinging of the pulling rod is also reduced.

BRIEF DESCRIPTION OF THE DRAWINGS

In order that the present invention may more readily be understood the following description is given, merely by way of example with reference to the accompanying drawings, in which:

FIG. 3 is a schematic illustration before the braking lever is depressed; and

FIG. 4 is still a schematic illustration after the braking lever is depressed.

DETAILED DESCRIPTION OF PREFERRED EMBODIMENT

Figure 1:
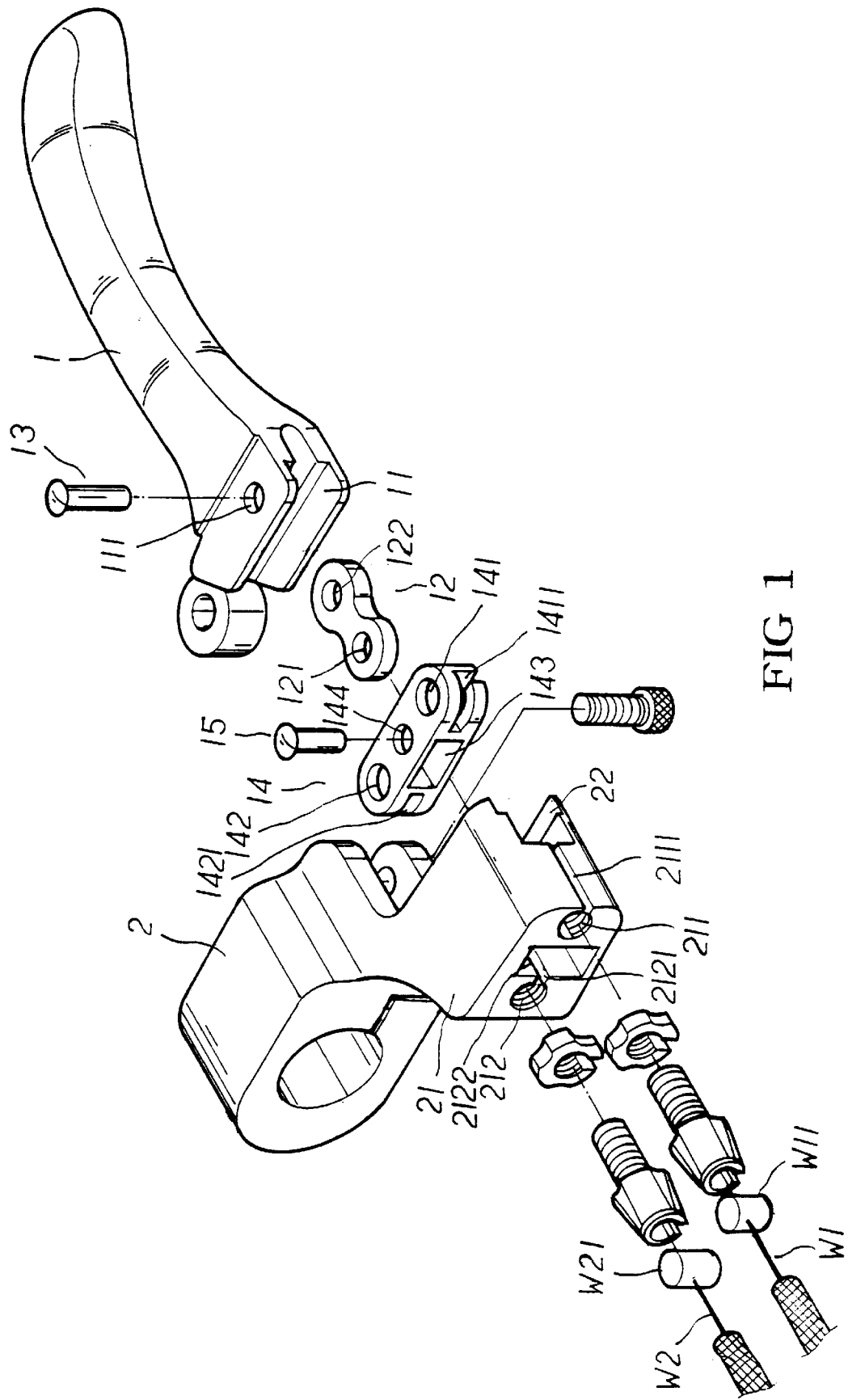
FIG. 1 is an exploded perspective view of the braking lever made according to the present invention.
Figure 2:
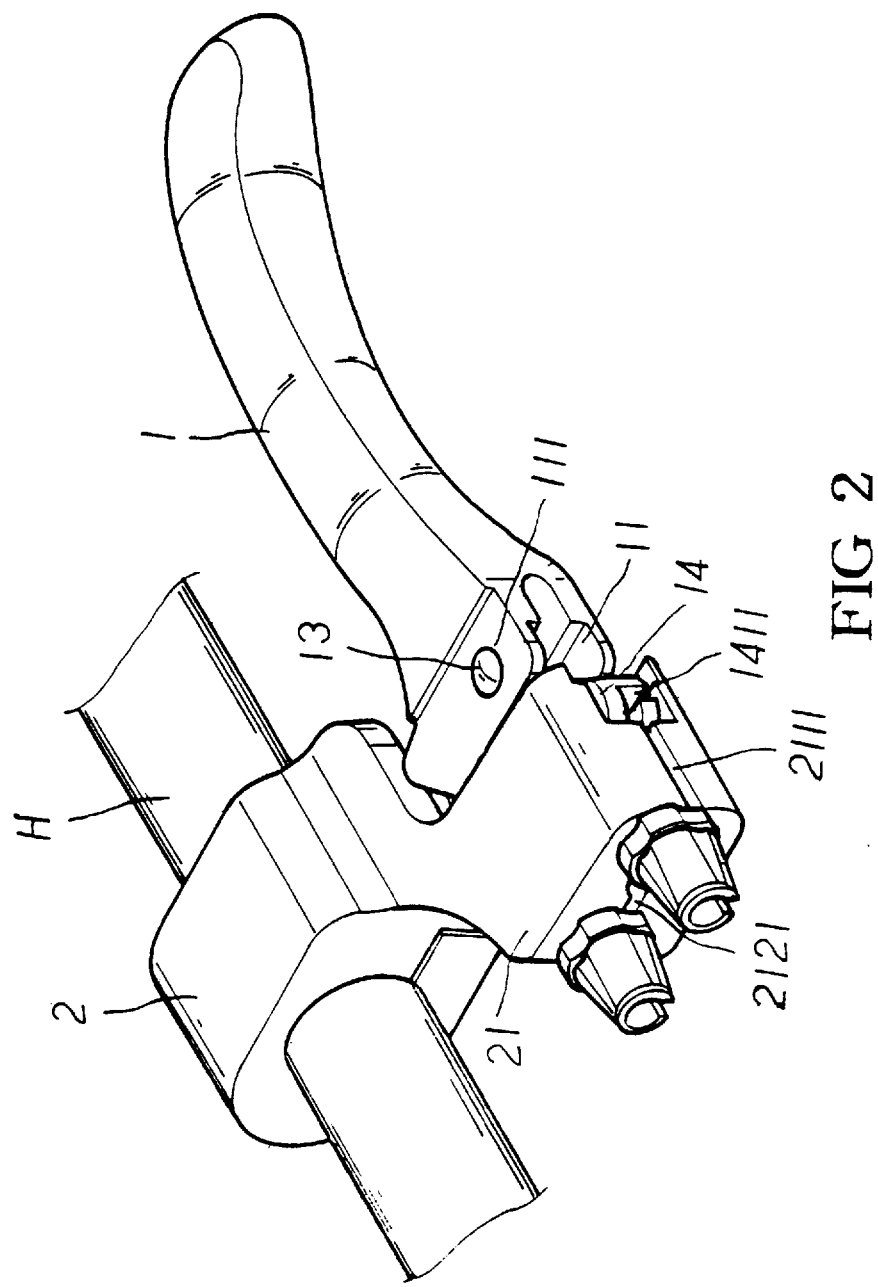
FIG. 2 is a perspective of the braking lever shown in FIG. 1.

Referring to FIGS. 1 and 2, the handlebar H of the motorcycle or bicycle is fixedly disposed with a mounting socket 2 for pivotally mounting a braking lever 1 thereof. The braking lever 1 is interconnected with both the braking mechanism of the front and rear wheels such that when the braking lever 1 is depressed, both the front and rear wheels can be braked. The mounting socket 2 is provided with a cable bracket 21 and which is provided with a front and rear cable guiding holes 211 and 212 for both the front cable W1 and rear cable W2. Each of the cable guiding holes 211 and 212 is provided with a sliding groove 2111 and 2121 vertically and which are communicated with the front and rear guiding holes 211 and 212. The rear sliding groove 2121 is further provided with an elongate hole 2122 and the rear end of the mounting bracket 21 is provided with a hidden groove 22.

The pulling end of the braking lever 1 is disposed with a connecting groove 11 having a through hole 111 thereof. A 8-shape plate 12 having a front and rear connecting holes 121, 122 is disposed within the connecting groove 11 such that each of the rear hole 122 of the 8-shape plate 12 is aligned with the through hole 111 of the connecting groove 11. A pin shaft 13 is used to pivotally attaching the 8-shape plate 12 to the braking lever 1 by passing through the rear through hole 111 of the braking lever 1 and the rear hole 122 of the 8-shape plate 12.

The braking lever assembly 1 is further provided with a pulling rod 14 which defines a left and right positioning holes 142, 141 at both ends. The pulling rod 14 is further provided with a passage 143 in the central portion and which is provided with a fixing hole 144 therethrough. Each of the left and right positioning holes 141 and 142 is provided with a gap 1421 and 1411 for cable. The pulling rod 14 can be pivotally attached to the front hole 121 of the 8-shape plate 12 by a pin shaft 15 which passes through the fixing hole 144 of the pulling rod 14 and the front hole 121 of the 8-shape plate 12 sequentially.

By the provision of the gaps 1411, 1421 and the sliding grooves 2111 and 2121, the cables W1 and W2 can be readily disposed within the guiding holes 211 and 212 respectively. Consequently, the anchoring head W11 and W21 are of the cables W1 and W2 pivotally disposed within the positioning holes 141 and 142. Then the pulling rod 14 together with the cables W1 and W2 can be suitably disposed within the hidden groove 22 of the mounting socket 2, as clearly shown in FIG. 3. In mounting the cables W1 and W2, the cables W1 and W2 are firstly disposed within the guiding holes 211 and 212 through the sliding grooves 2111 and 2121 respectively, then the anchoring head W11 and W21 can be disposed within the positioning holes 141 and 142 respectively, afterward the cables W1 and W2 are sliding over the gaps 1411 and 1421 respectively. Of course, the other end of the cables W1 and W2 are connected to the braking mechanisms (not shown) of the front and rear wheels respectively.

Referring to FIG. 4, when the braking lever 1 is depressed, the 8-shape plate 12 is pulled backward together with the pulling rod 14. As a result, the cables W1 and W2 are also pulled backward and the braking mechanisms of the front and rear wheels are actuated. Because the pulling rod 14 are pivotally disposed at the front hole 121 of the 8-shape plate 12, an automatically adjustment and compensation function is provided. For example, after a period of usage, the braking linings on the front or rear braking drums can be worn and in normal case, the wearing on the front and rear linings are not always equal. By the pivotal arrangement of the cables W1 and W2 on the pulling rod 14, this imbalance can be readily compensated by the shifting of the pulling rod 14. By this arrangement, the front and rear braking mechanisms are also simultaneously and synchronously actuated. As a result, the sliding or rolling during the braking are suitably reduced or even eliminated and the driving safety is there increased.

By the provision of the present invention as it is applied onto a bicycle, the rider may simply take a drink from the water pot while manipulate the handlebar with another hand. In case of any accident, a simple actuation of the braking lever can actuate both braking mechanisms of the front and rear wheels.

While particular embodiment of the present invention has been illustrated and described, it would be obvious to those skilled in the art that various other changes and modifications can be made without departing from the spirit and scope of the invention. It is therefore intended to cover in the appended claims all such changes and modifications that are within the scope of the present invention.

What is claimed is:

1. A braking lever assembly for synchronically actuating braking mechanisms, comprising a mounting socket which can be fixedly mounted onto the handlebar of a bicycle or motorcycle, a front portion of said mounting socket being provided with a front and rear cable guiding holes for braking cables, each of said cable guiding holes being provided with a sliding groove which is in communication with the corresponding guiding hole, said rear cable guiding hole being provided with an elongate hole, said mounting socket being provided with a hidden groove at rear portion; and a braking lever being pivotally attached to said mounting socket, a pulling end of said braking lever being provided with a connecting groove having a through hole thereof, a 8-shape plate having a front and rear connecting holes being pivotally connected within said connecting groove by means of a pin shaft which passes through said through hole of said connecting groove and said rear hole of said 8-shape plate, said braking lever being further provided with a pulling rod which has a left and right positioning holes at both ends for attaching an anchoring head of said brake cables therein respectively, said pulling rod being further provided with a passage which has a through hole thereof and the front hole of said 8-shape plate can be inserted into said passage and pivotally retained therein, each of said positioning holes of said pulling rod being provided with a guiding gap for said one of respective braking cables.

2. A braking lever assembly for synchronically actuating braking mechanisms as recited in claim 1, wherein the wearing of the lining in the braking mechanism can be readily adjusted and compensated by the shifting of said pulling rod which is pivotally connected to said 8-shape plate such that the braking forces applied to both the front and rear braking cables are equal.

* * * * *